United States Patent [19]

Ravipati et al.

[11] Patent Number: 5,438,470
[45] Date of Patent: Aug. 1, 1995

[54] MAGNETORESISTIVE STRUCTURE WITH CONTIGUOUS JUNCTION HARD BIAS DESIGN WITH LOW LEAD RESISTANCE

[75] Inventors: Durga Ravipati, Saratoga; Yong Shen, Milpitas; William C. Cain, San Jose, all of Calif.

[73] Assignee: Read-Rite Corporation, Milpitas, Calif.

[21] Appl. No.: 242,457

[22] Filed: May 13, 1994

[51] Int. Cl.⁶ ............................................. G11B 5/33
[52] U.S. Cl. ................................................ 360/113
[58] Field of Search ................................... 360/113

[56] References Cited

U.S. PATENT DOCUMENTS

| | | | |
|---|---|---|---|
| 4,271,441 | 6/1981 | Greiner et al. | 360/130.33 |
| 4,639,806 | 1/1987 | Kira et al. | 360/113 |
| 4,663,685 | 5/1987 | Tsang | 360/113 |
| 4,803,580 | 2/1989 | Mowry | 360/113 |
| 5,005,096 | 4/1991 | Krounbi et al. | 360/113 |
| 5,018,037 | 5/1991 | Krounbi et al. | 360/113 |
| 5,168,409 | 12/1992 | Koyama et al. | 360/113 |
| 5,351,158 | 9/1994 | Shibata et al. | 360/113 |

FOREIGN PATENT DOCUMENTS

552890A2 7/1993 European Pat. Off. .

Primary Examiner—John H. Wolff
Assistant Examiner—Adriana Giordana
Attorney, Agent, or Firm—Nathan N. Kallman

[57] ABSTRACT

A magnetoresistive read transducer includes a magnetoresistive (MR) layer having end regions spaced by a central active regions. A pair of hard-magnetic layers provide the longitudinal magnetic bias to the magnetoresistive layer. Each of the hard-magnetic layers is disposed in contact with one of the end regions of the magnetoresistive layer. In addition, a pair of electrical leads provide the bias current to the magnetoresistive layer. Each of the electrical leads is also disposed in contact with one of the end regions of the magnetoresistive layer. This arrangement enable the transducer of the present invention with the most optimal design. In essence, electrical current directly passes through the central active region of the magnetoresistive layer via the electrical leads as a low electrical resistance path. Magnetic flux of the longitudinal bias directly passes through the central active region of the magnetoresistive layer with a reduced probability of magnetic discontinuity.

15 Claims, 3 Drawing Sheets

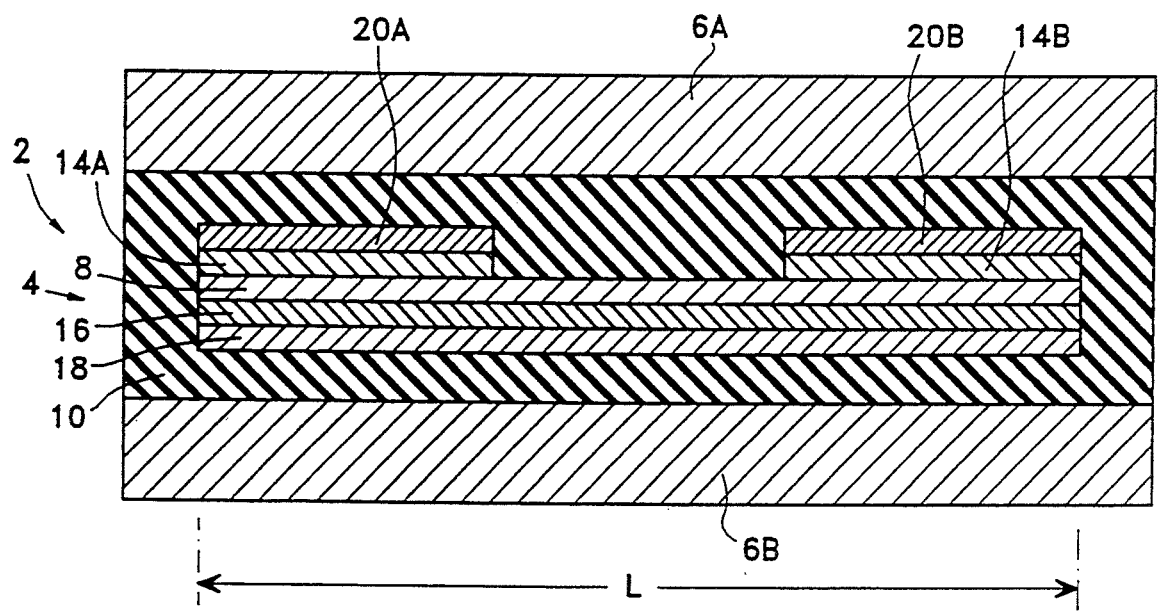
Fig. 1    (PRIOR ART)
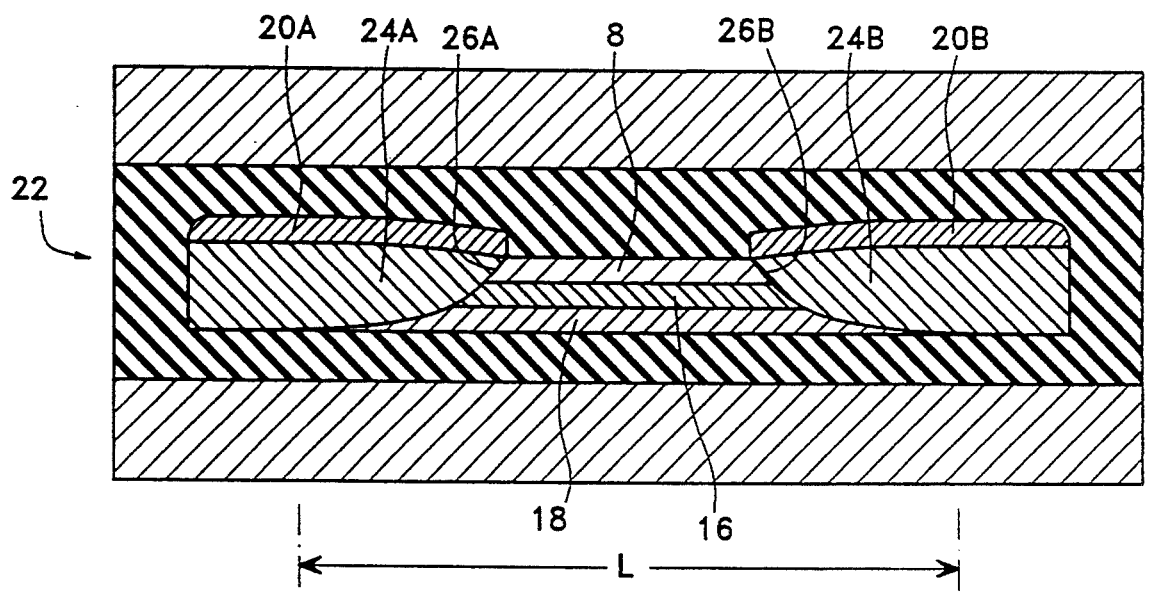
Fig. 2    (PRIOR ART)

MAGNETORESISTIVE STRUCTURE WITH CONTIGUOUS JUNCTION HARD BIAS DESIGN WITH LOW LEAD RESISTANCE

FIELD OF THE INVENTION

This invention relates to magnetoresistive (MR) structures and in particular to MR structures incorporating a hard bias design with lowered resistance.

DESCRIPTION OF THE RELATED ART

Heretofore, various devices have been made for the detection of information stored on magnetic media. Inductive sensors were commonly used in the past. More recently, different types of magnetoresistive structures have been suggested and implemented.

The advantage of using a magnetoresistive element in a magnetic read transducer is multi-fold. Present day thin-film technology allows magnetoresistive transducers applicable to high density storage applications to be fabricated on a miniaturized scale. The magnetoresistive transducer can read information on a recording medium with much narrower track widths. Equally as important, the output signals generated during the read process are independent of the traveling speed of the recording medium, and are of significantly higher output amplitude. As a result, larger signal amplitude known pulse slimming techniques can be used to further enhance linear density of the signal.

FIG. 1 is a cross-sectional view of a conventional magnetoresistive transducer taken along a plane parallel to the Air Bearing Surface (ABS) of the device. The transducer, generally designated by reference numeral 2, comprises a multi-layer structure 4 sandwiched between a pair of shields 6A and 6B via an insulating dielectric 10. Shields 6A and 6B are commonly made of a ferromagnetic material with a high permeability and a low coercive force. The function of shields 6A and 6B, which encompass the multi-layer structure 4, is to produce a high resolution device. Multi-layer structure 4 includes a magnetoresistive (MR) layer 8 of soft ferromagnetic material having a low coercive force. During the read process, changes in magnetic flux passing through the magnetoresistive layer 8 vary the resistivity of magnetoresistive layer 8. This feature establishes the basis for the read capability of transducer 2, which will be explained further later. As is well known in the art, to suppress the Barkhausen noise, magnetoresistive layer 8 must be aligned in a single-domain state. Hard-magnetic layers 14A and 14B carry out this duty by providing a longitudinal magnetic bias to magnetoresistive layer 8. Moreover, for magnetoresistive layer 8 to operate within a linear region, another bias, called the transverse magnetic bias, must also be applied to layer 8. The Soft Adjacent Layer (SAL) 18 disposed adjacent to magnetoresistive layer 8 fulfills this function. The soft adjacent layer 18 and the magnetoresistive layer 8 are spaced by a spacer layer 16 which is normally made of a nonmagnetic material. The soft adjacent layer 18 is generally formed of a soft magnetic material having a high permeability and is essentially magnetically saturated in a direction transverse to the longitudinal bias derived from the hard magnetic layer.

During the read mode, a bias current is applied through electrical leads 20A and 20B which are normally made of an electrically conductive material such as Tungsten (W) or Gold (Au). The bias current passes through the magnetoresistive layer 8 via the hard-magnetic layers 14A and 14B. As was mentioned previously, changes in the magnetic flux intercepted by the transducer 2 vary the electrical resistivity of the magnetoresistive layer 8. The current passing through the magnetoresistive layer 8 varies the resistivity and accordingly generates a varying voltage. This voltage corresponds to the information read out from the storage medium (not shown). The varying voltage is available at electrical leads 20A and 20B and can be fed to a sense amplifier (not shown) for amplification. It should be noted that in transducer 2, hard-magnetic layers 14A and 14B are interposed between electrical leads 20A and 20B, respectively.

U.S. Pat. No. 4,663,685 and 5,005,096 describe systems using a current path from connecting leads, which contains a coextensive region of longitudinal bias permanent magnet material, such as CoP and layers of CoCr, CoNiCr or CoCrPt. The patents describe an additional coextensive conductive layer which further increases the electrical resistance of the current path to the MR layer. Thus the prior art patents exhibit higher resistance paths to the MR layer which is an undesirable condition.

To enhance the longitudinal magnetic bias, a different type of transducer has been implemented for this invention. FIG. 2 shows such a transducer designated by reference numeral 22. In transducer 22, hard-magnetic bias layers 24A and 24B form abutting junctions 26A and 26B, respectively, with magnetoresistive layer 8. Hard-magnetic layers 24A and 24B supply a more continuous longitudinal magnetic bias as well as a more direct path to the magnetoresistive layer 8, in comparison with the transducers shown in the referenced patents. With prior art transducers, as shown in FIGS. 1 and 2, a bias electrical current is supplied through magnetoresistive layer 8 via electrical leads 20A and 20B during the read mode. Electrical leads 20A and 20B are disposed in contact with the hard-magnetic bias layers 24A and 24B. The bias current must pass through the abutting junctions 26A and 26B in order to reach magnetoresistive layer 8. However, abutting junctions 26A and 26B are sometimes affixed with residual oxides left over from the fabrication process. These residual junction oxides do not affect the magnetic flux of the longitudinal magnetic bias, but can be detrimental to the passage of bias current, and consequently the sensed voltage. As a result, the signal-to-noise ratio can be deteriorated in some instances, and may even cause reliability problems in other instances. To rectify this shortfall, the residual oxides may be more thoroughly removed, but at the expenses of extra manufacturing steps and tighter monitoring processes. Transducers of this type can be found in U.S. Pat. No. 5,018,037, Krounbi et al., entitled "Magnetoresistive Read Transducer Having Hard Magnetic Bias", issued May 21, 1991.

Another disadvantage associated with the design of transducer 22 is that the lateral dimension L, defined as the longest dimension extended by any of the layers 8, 16 and 18, can not be further reduced because of the magnetic constraint imposed by the design. For magnetic reliability, each of the hard-magnetic layers 24A and 24B is preferably short and with a short interface with the magnetoresistive layer 8. However, for electrical reliability, each of the hard-magnetic layers 24A and 24B needs to be long and preferably with a long interface with the magnetoresistive layer 8. In actual applications, a middle ground is normally chosen between the two sets of conflicting requirements. Accordingly, transducer 22 is a compromise between conflicting requirements.

The constant demand for electronic products with compact sizes and portable features prompts manufacturers to provide storage devices with ever decreasing geometries. There is a compellling need for magnetic read transducers capable of reading information on recording media with narrow track widths and high linear recording densities.

SUMMARY OF THE INVENTION

It is an object of the present invention to provide a magnetoresistive read transducer with improved performance that is designed optimally for both magnetic and electrical reliabilities. The objective is to ease the fabrication of devices by relaxing manufacturing tolerances and requiring less stringent monitoring processes.

In the preferred embodiment of the invention, the magnetoresistive read transducer includes a magnetoresistive layer having end regions spaced by a central active region. A pair of hard-magnetic layers provide the longitudinal magnetic bias to the magnetoresistive layer. Each of the hard-magnetic layers is disposed in contact with one of the end regions of the magnetoresistive layer. In addition, a pair of electrical leads provides the sense current to the magnetoresistive layer. Each of the electrical leads is also disposed in contact with one of the end regions of the magnetoresistive layer. In essence, electrical current directly passes through the central active region of the magnetoresistive layer via the electrical leads as a low electrical resistance path. Magnetic flux from the bias film renders the central MR active region in a single domain state.

These and other features and advantages of the invention will be apparent to those skilled in the art from the following detailed description, taken together with the accompanying drawings.

DESCRIPTION OF THE DRAWINGS

FIG. 1, as described above, is a cross 1 view of a prior art magnetoresistive read transducer taken along a plane parallel the air bearing surface of the transducer;

FIG. 2, as described above, is a cross-sectional view of another prior art magnetoresistive read transducer taken along a plane parallel the air bearing surface of the transducer;

DETAILED DESCRIPTION OF THE INVENTION

Figure 3:
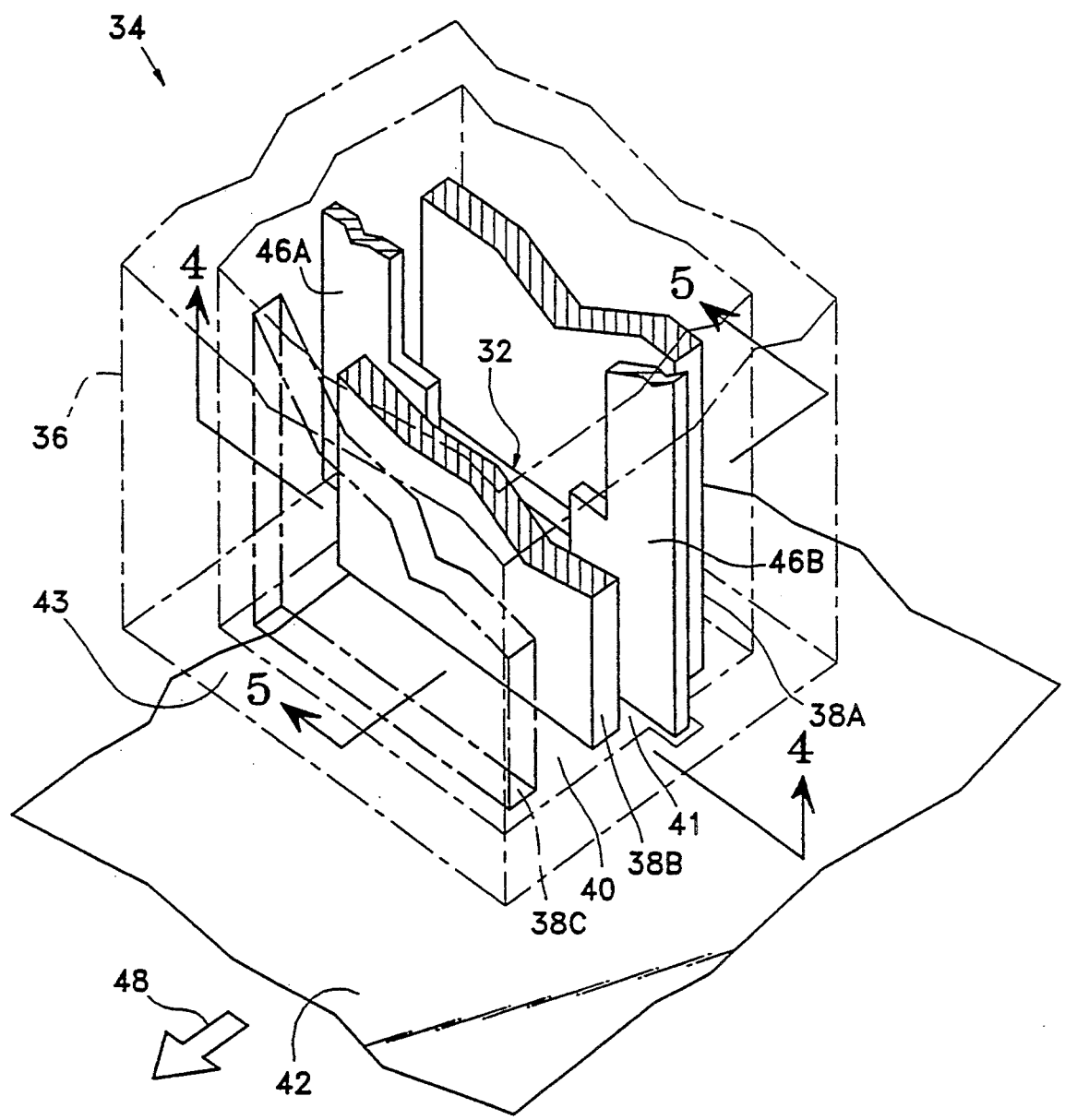
FIG. 3 is a simplified perspective view of the preferred embodiment of the present invention.
Figure 4:
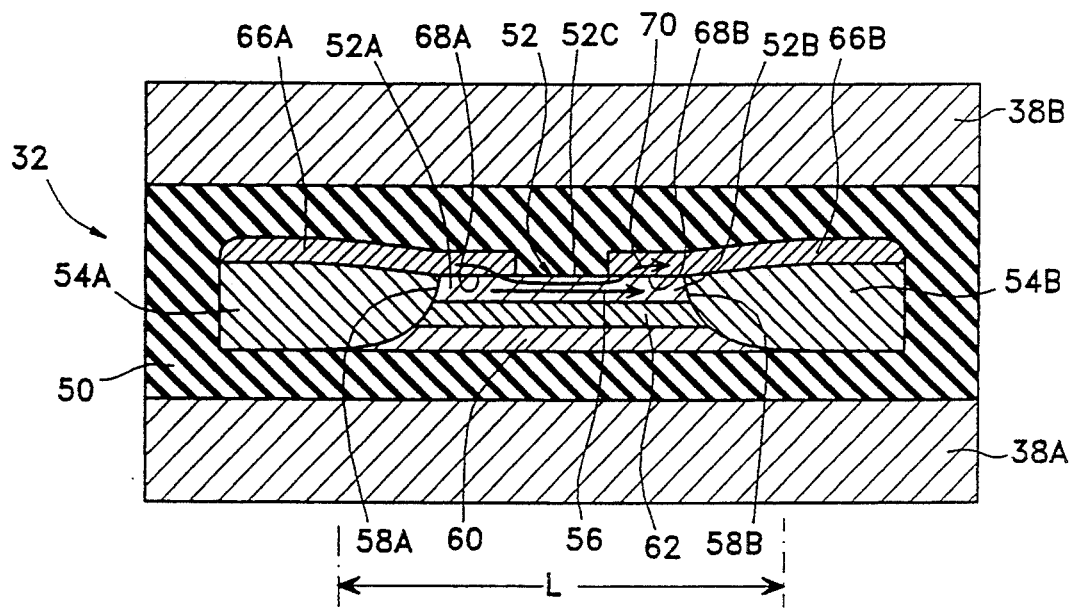
FIG. 4 is a cross-sectional view taken along line 4—4 of FIG. 3.

With reference to FIGS. 3 and 4, a transducer 32 is disposed in a magnetic head 34 having a protective shell 36. The protective shell 36 is preferably made of a non-magnetic and nonconducting material, such as ceramic. There are a plurality of magnetic shields 38A–38C located inside the protective shell 36. Shields 38A–38C are installed for confining magnetic flux in a controllable manner for various purposes. For example, between shields 38B and 38C is a write gap 40 in which magnetic flux emanating from a write coil (not shown) passes through onto a recording medium 42 during the write mode. Between shields 38A and 38B is the read gap 41 in which magnetic flux from the recording medium 42 enters through onto read transducer 32 during the read mode. Magnetic shields 38A–38C are preferably made of a soft magnetic material having a low coercive force and a high permeability. Examples are Permalloy(NiFe) and sendust (AlSiFe). There are also two conducting strips 46A and 46B connected to read transducer 32 for conveying sensed electrical signals to a sense amplifier (not shown).

During the read mode, recording medium 42 travels in the direction 48 underneath the air bearing surface 43 of magnetic head 34, for example. Information stored on recording medium 42 is intercepted by transducer 32 as changes of magnetic flux. These changes of magnetic flux are converted by the transducer 32 into electrical signals at conductor strips 46A and 46B. Not shown in FIG. 1 is the insulating dielectric between shields 38A–38C. However, the insulating dielectric is shown in FIGS. 4 and 5.

Figure 5:
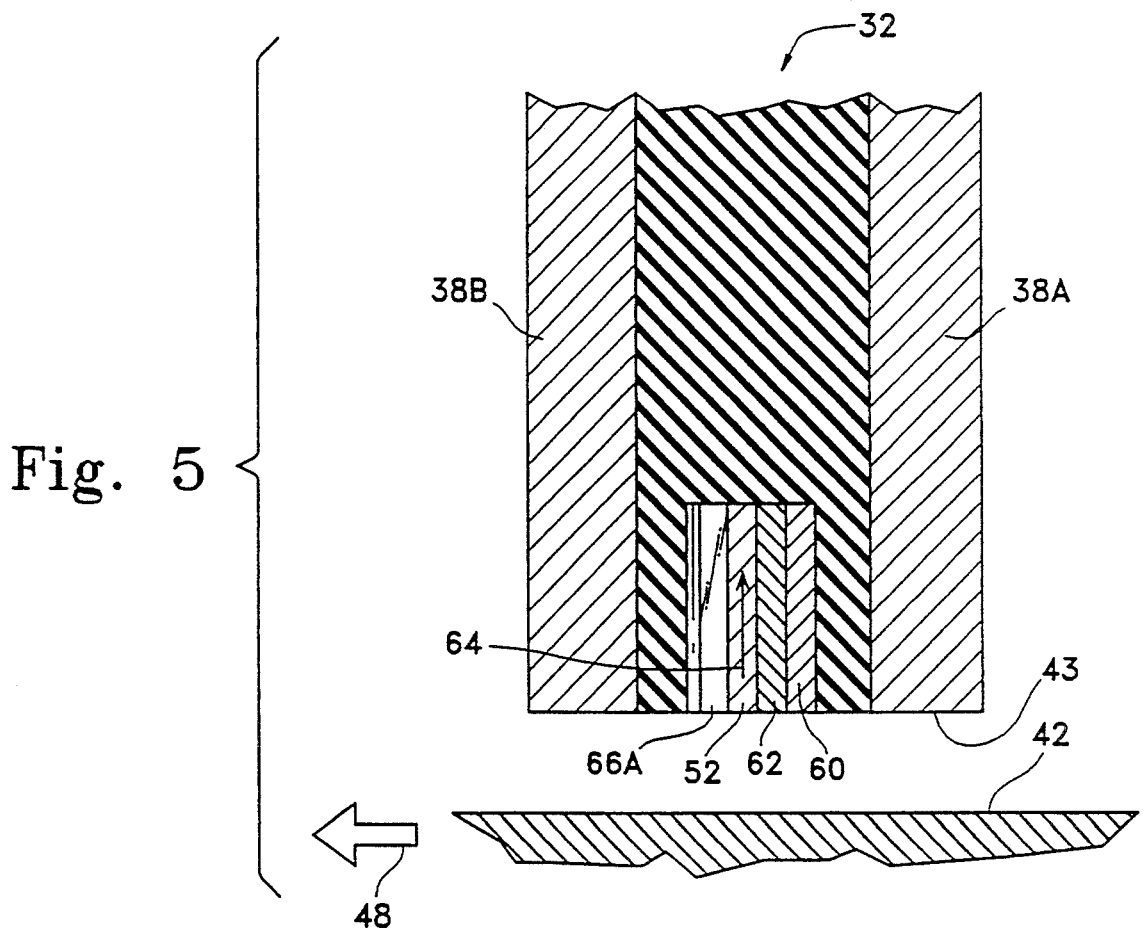
FIG. 5 is a cross-sectional view taken along line 5—5 of FIG. 3.

Reference is now made to FIGS. 4 and 5 which are cross-sectional views taken along lines 4—4 and 5—5, respectively, of FIG. 3. Disposed between shields 38A and 38B is the read transducer 32 which separates from shields 38A and 38B by an insulating dielectric 50. Insulating dielectric 50 is preferably a material which is non-magnetic and non-conducting. In the preferred embodiment, insulating dielectric 50 comprises alumina ($Al_2O_3$). The transducer 32 includes a magnetoresistive layer 52 formed of a soft magnetic material having a high permeability and a low coercive force. Magnetoresistive layer 52 comprises two end regions 52A and 52B spaced by a central active region 52C. Disposed at each of the end regions 52A and 52B are hard-magnetic layers 54A and 54B, respectively. To suppress the Barkhausen noise, hard-magnetic layers 54A and 54B are permanently magnetized and cooperatively provide a longitudinal magnetic bias for maintaining a single domain state in magnetoresistive layer 52. The magnetic moment for the longitudinal magnetic bias is designated by reference numeral 56. In this embodiment, hard-magnetic layers 54A and 54B are disposed in abutting contact with regions 52A and 52B of magnetoresistive layer 52 through abutting junctions 58A and 58B, respectively. Hard-magnetic layers 54A and 54B are made of a material having a high magnetic moment and a high coercive force. Examples are alloys of Cobalt, Chromium and Platinum (CoCrPt), Cobalt and Chromium (CoCr), and Cobalt, Chromium and Tantalum (CoCrTa). In the preferred embodiment, magnetoresistive layer 52 comprises a ferromagnetic material called permalloy (NiFe), and is formed by the conventional deposition process with a thickness of between 50 to 500 Angstroms. A hard-magnetic layer is deposited to a thickness of between 200 to 800 Angstroms. There is a soft-magnetic layer 60, sometimes called the soft adjacent layer, disposed parallel to but spaced from the magnetoresistive layer 52 by a spacer layer 62. To position the magnetoresistive layer 52 to function within the linear operating region, another bias, called the transverse magnetic bias, is provided by the soft-magnetic layer 60. The magnetic moment for the transverse magnetic bias is designated by reference numeral 64 as shown in FIG. 5. Soft-magnetic layer 60 is formed of a material with a low coercive force and a high permeability. In this embodiment, soft-magnetic layer 60 includes an alloy of Nickel, Iron and Rhodium (NiFeRh) and is formed by the conventional deposition process with a thickness of between 50 to 400 Angstroms. The spacer layer 62 comprises Tantalum (Ta) with a deposited thickness ranging from 50 to 200 Angstroms.

There are also electrical leads 66A and 66B formed in contact with end regions 52A and 52B of the magnetoresistive layer 52 through contact junctions 68A and 68B, respectively. In this case, electrical leads 66A and 66B are also disposed in contact with the hard-magnetic bias layers 54A and 54B, respectively, as shown in FIG. 4. Electrical leads 66A and 66B are electrical conductors and can be made from a variety of materials with high electrical conductivity. Examples are metals or various alloys including Gold (Au), Copper (Cu) and Tungsten (W). In the preferred embodiment, electrical leads are made of gold on a thin layer of about 100 Angstroms of tanatalum and are deposited by a conventional deposition process with a thickness of between 500 to 3,000 Angstroms.

The operational detail of the transducer 32 is herein described. During the read mode, a sense current 70 is applied to electrical leads 66A and 66B (FIG. 4). Recording medium 42 moves in the direction 48, and accordingly, transducer 32 experiences changes in magnetic flux (FIG. 5). These changes in magnetic flux are intercepted by the magnetoresistive layer 52 which reacts correspondingly with changes in resistivity. As a result, a varying voltage is generated from the sense current 70 flowing through the magnetoresistive layer 52 with varying resistivity. The varying voltage constitutes the electrical signals which correspond to the information read out from the recording medium 42. The electrical signals can be fed to a sense amplifier (not shown) via electrical leads 66A and 66B for amplification. As was mentioned earlier, soft-magnetic bias layer 60 appropriately positions magnetoresistive layer in the linear operating region, and hard-magnetic layers 66A and 66B properly suppress the Barkhausen noise. The output signals therefore vary substantially linearly with respect to the changes in magnetic flux emanating from the moving recording medium 42.

It needs to be emphasized that contrary to many prior art read transducers, electrical leads 66A and 66B are in contact with end regions 52A and 52B of magnetoresistive layer 52 through contact junctions 68A and 68B, respectively. In essence, electrical current 70 and longitudinal magnetic bias 56 assume somewhat separated paths. In most prior art magnetoresistive transducers, electrical leads are not formed in contact with the magnetoresistive layer, whereby, current and longitudinal magnetic bias are arranged to share a common path through the hard-magnetic bias layers. This is based on the belief that a shared magnetic and electrical path occupies less physical space and therefore a smaller transducer can be built as a result. However, to be electrically reliable, the hard-magnetic layers and their interface junctions with the magnetoresistive layer have to be large in surface area in order to minimize the electrical resistance and to minimize the possibility of open contacts caused by the manufacturing process and possible electromigration problems caused by high density current forced through the junction. On the other hand, larger surface areas for the hard-magnetic layer and their interface junctions increase the chance of magnetic discontinuity, which in turn negatively affect the magnetic reliability. In practical applications, as a compromise, a middle ground is very often chosen between the two extremes. For this reason, most prior art transducers are not optimally designed.

In the transducer 32 of the present invention, with electrical leads 66A and 66B in contact with magnetoresistive layer 52, together, they form an electrical path of low lead resistance. There is no further need for hard-magnetic layers 54A and 54B and their interface junctions with the layer 52 to be designed with large surface areas for electrical reliability concern. Consequently, lateral dimension L can be scaled down with a smaller geometry which in turn allows the recording track width on the recording medium 42 to be further reduced. A transducer with higher performance can thus be fabricated.

It should also be noted that during the read mode, the majority of the activity is substantially concentrated at the central active region 52C of the magnetoresistive layer 52. In the transducer 32 of the present invention, the extended contact junctions 68A and 68B enable current 70 to considerably pass through the active central region 52C of the magnetoresistive layer 52. The consequential benefit is that there is lower lead resistance for the bias current, and a better signal-to-noise ratio for the sensed voltage. Furthermore, there is an extra level of electrical reliability associated with transducer 32 of the invention. As shown in FIG. 4, electrical leads 66A and 66B are also disposed in contact with hard-magnetic layers 54A and 54B, respectively. In the event there is an open contact in either contact junction 68A or 68B, for example, due to prolong usage or due to the imperfect manufacturing process, current 70 can always passes through the corresponding hard-magnetic layer 54A or 54B. The transducer 32 may not be as good in performance as before, nevertheless transducer 32 is still functional. The chance of encountering a disastrous failure is thereby minimized.

Other changes are possible within the scope of the invention. For example, electrical leads 66A and 66B do not have to be disposed in contact with the respective hard-magnetic layers 54A and 54B as shown in FIG. 4. Moreover, the transducer 32 need not be arranged in a manner as described in the preferred embodiment. For instance, transducer 32 can well be disposed between a gap formed by two shields coplanar with each other. These and other changes in form and detail may be made therein without departing from the scope and spirit of the invention as defined by the appended claims.

What is claimed is:

1. A thin-film magnetoresistive transducer comprising:

a magnetoresistive layer formed of a ferromagnetic material, said magnetoresistive layer including end regions spaced by a central active region;

first and second hard-magnetic layers, each of said hard-magnetic layers being disposed in abutting contact with one of said end regions of said magnetoresistive layer, said hard-magnetic layers cooperatively providing a magnetic bias to said magnetoresistive layer; and first and second electrical leads formed of an electrically conductive material, each of said electrical leads being disposed in contact respectively with one of said end regions of said magnetoresistive layer, such that said first and second electrical leads and said magnetoresistive layer form a direct electrical path of low lead resistances, said each one of said electrical leads forming abutting junctions with said magnetoresistive layer and one of said hard magnetic layers 2. The thin-film magnetoresistive transducer as set forth in claim 1 wherein each of said electrical leads is disposed in contact with one of said hard-magnetic layers.

3. The thin-film magnetoresistive transducer as set forth in claim 1 wherein said magnetoresistive layer comprises Permalloy.

4. The thin-film magnetoresistive transducer as set forth in claim 1 wherein said first and second hard-magnetic layers comprise an alloy of cobalt, chromium and platinum on a chromium underlayer.

5. The thin-film magnetoresistive transducer as set forth in claim 1 wherein said magnetic bias is a longitudinal magnetic bias, and wherein said transducer further comprises a soft-magnetic layer disposed parallel to and separated from said magnetoresistive layer by a spacer layer, said soft-magnetic layer providing a transverse magnetic bias to said magnetoresistive layer.

6. The thin-film magnetoresistive transducer as set forth in claim 5 wherein said soft-magnetic layer comprises an alloy of nickel, iron and rhodium and said spacer layer comprises tantalum.

7. The thin-film magnetoresistive transducer as set forth in claim 6 wherein said magnetoresistive layer, said first and second hard-magnetic layers, said spacer layer and said soft-magnetic layer are disposed between two magnetic shields formed of a soft magnetic material.

8. A thin-film magnetoresistive transducer having low signal lead resistance and for converting changes in magnetic flux from a recording medium to electrical signals, comprising:
a magnetoresistive layer formed of a ferromagnetic material, said magnetoresistive layer including end regions spaced by a central active region, said magnetoresistive layer varying in electrical resistivity in response to the changes in magnetic flux;
first and second hard-magnetic layers, each of said hard-magnetic layers being disposed in abutting contact with one of said end regions of said magnetoresistive layer, said hard-magnetic layers cooperatively providing a longitudinal magnetic bias to said magnetoresistive layer; and
first and second electrical leads formed of an electrically conductive material, each of said electrical leads being disposed in contact with one of said end regions of said magnetoresistive layer, such that when an electrical current passes through said magnetoresistive layer which varies in resistivity in response to the changes in magnetic flux intercepted by said transducer, a varying voltage is correspondingly generated at said magnetoresistive layer, the varying voltage corresponding to the electrical signals which directly pass through said electrical leads as the path of low lead resistance, each one of said electrical leads forming abutting junctions with said magnetoresistive layer and one of said hard magnetic layers 9. The thin-film magnetoresistive transducer as set forth in claim 8 further comprising a soft-magnetic layer disposed parallel to and separated from said magnetoresistive layer by a spacer layer, said soft-magnetic layer providing a transverse magnetic bias to said magnetoresistive layer.

10. The thin-film magnetoresistive transducer as set forth in claim 9 wherein said soft-magnetic layer comprises an alloy of nickel, iron and rhodium and said spacer layer comprises tantalum.

11. The magnetoresistive read transducer as set forth in claim 10 wherein said hard-magnetic layers comprise an alloy of cobalt, chromium and platinum on a chromium underlayer.

12. The magnetoresistive read transducer as set forth in claim 11 wherein said electrical leads comprise gold on a thin layer of tantalum and said magnetoresistive layer comprises Permalloy.

13. The thin-film magnetoresistive transducer as set forth in claim 12 wherein said magnetoresistive layer, said first and second hard-magnetic layers, said spacer layer and said soft-magnetic layer are disposed between two magnetic shields formed of a soft magnetic material.

14. The magnetoresistive read transducer as set forth in claim 8 wherein said hard-magnetic layers comprise an alloy of cobalt, chromium and platinum on a chromium underlayer.

15. The magnetoresistive read transducer as set forth in claim 8 wherein said electrical leads comprise gold on a thin layer of tantalum and said magnetoresistive layer comprises Permalloy.

* * * * *